United States Patent [19]
Scott et al.

[11] 3,771,254
[45] Nov. 13, 1973

[54] INSECTICIDE-TREATED BAGS

[75] Inventors: John Troye Scott, Datchworth, Hertfordshire; Roger Tuson Taylor, Maidenhead, Berkshire, both of England

[73] Assignee: Imperial Chemical Industries Limited, London, England

[22] Filed: Jan. 4, 1972

[21] Appl. No.: 215,393

[30] Foreign Application Priority Data
Jan. 6, 1971   Great Britain.................. 660/71
June 22, 1971   Great Britain............... 29179/71

[52] U.S. Cl. ............... 43/131, 43/120, 206/46 PV, 220/65, 424/200
[51] Int. Cl. ....................... A01m 1/10, A01m 1/20
[58] Field of Search................. 43/131, 132 R, 120, 43/121, 133, 124; 206/56 AA, 46 PV; 220/65; 424/200

[56] References Cited
UNITED STATES PATENTS

| | | | |
|---|---|---|---|
| 3,295,246 | 1/1967 | Landsman et al. ................... | 43/131 |
| 3,094,805 | 6/1963 | Luck.................................... | 43/131 |
| 3,653,145 | 4/1972 | Stout.................................... | 43/131 |
| 2,139,040 | 12/1938 | Salfisberg...................... | 43/131 UX |
| 3,630,446 | 12/1971 | Roth et al......................... | 43/131 X |
| 3,032,915 | 5/1962 | Giroud-Abel......................... | 43/131 |
| 3,605,321 | 9/1971 | Lazarus................................ | 43/131 |
| 3,156,355 | 11/1964 | Rodgers......................... | 206/56 AA |
| 3,304,646 | 2/1967 | Staley ................................. | 43/131 |

*Primary Examiner*—Louis G. Mancene
*Assistant Examiner*—James H. Czerwonky
*Attorney*—Cushman, Darby & Cushman

[57] ABSTRACT

Plastic bags, especially polyethylene bags, coated or impregnated with an organophosphorus insecticide, especially pirimiphos methyl. The pirimiphos methyl has a vapor pressure at 20° C in the range $1 \times 10^{-3} - 1 \times 10^{-6}$ millimeters of mercury, and is used in an amount of 1 to 100 m.g. of the insecticide per square foot of bag surface.

5 Claims, 3 Drawing Figures

INSECTICIDE-TREATED BAGS

The present invention relates to bags and more particularly to bags made of flexible plastics sheet material. By the term 'bags' we include sacks and the like, open or closed at either or both ends.

According to the present invention we provide a bag of flexible plastics sheet material coated or impregnated with an organo-phosphorus insecticide.

Figure 1:
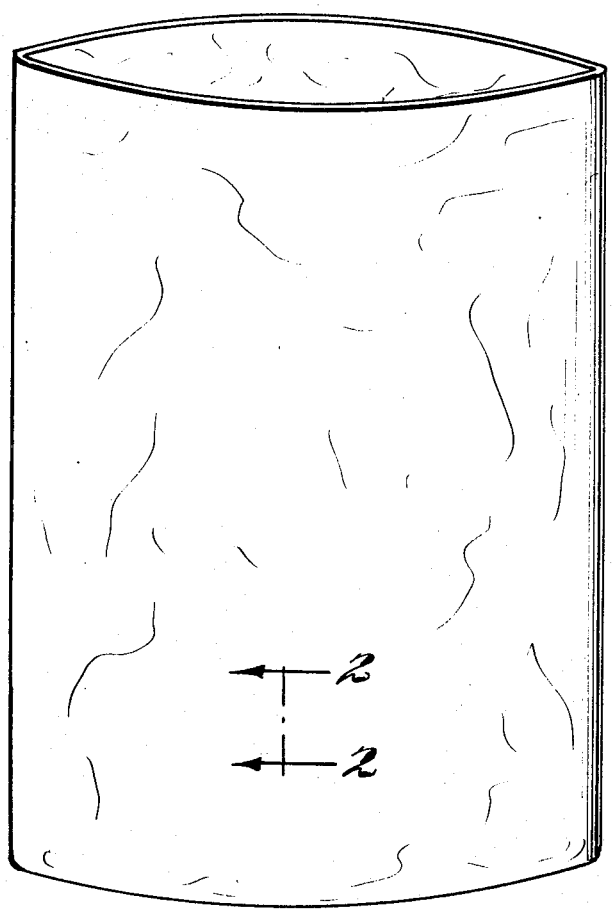
FIG. 1 is a perspective view of a bag coated or impregnated according to the present invention.
Figure 2:
FIG. 2 is an enlarged fragmented section of an impregnated bag along line 2—2 of FIG. 1.
Figure 3:
FIG. 3 is an enlarged fragmented section of a coated bag along line 2—2 of FIG. 1.

Examples of suitable organophosphorus insecticides are DDVP, and pirimiphos ethyl. Particularly suitable organophosphorus insecticides have a vapour pressure in the range $1 \times 10^{-3} - 1 \times 10^{-6}$ mm Hg at 20° C. It is especially preferred to use an organophosphorus insecticide of low mammalian toxicity such as malathion or fenitrothion. The most preferred insecticide for use in our invention is pirimiphos methyl, but diazinon is also very useful.

The bags of our invention may be made from any film-forming polymer, including polyvinyl chloride and copolymers thereof, e.g. with vinylidine chloride; polypropylene; polysulphones and poly-4-methyl-pentene-1. We particularly prefer to use low density polythene on account of its cheapness, wide use in the manufacture of bags, and its permeability characteristics. Preferred grades of polyethylene for use in making bags have a Melt Flow Index (as measured by ASTM test 1238/56) of 0.1 to 20, especially 0.3 to 2.0.

Bags according to our invention are preferably made by first forming the selected plastics material into flexible sheet and thereafter coating or impregnating the sheet or parts thereof with the selected insecticide. The sheet may be formed into bags by welding or sticking of appropriately shaped blanks either before or after the coating or impregnation step. Sheet may be made by calendering, or by extrusion, preferably followed by drawing in one or more directions at right angles to each other. The preferred method of making polyethylene into sheet or film is the well known 'bubble' method in which a tube of polyethylene is extruded and thereafter caused to expand by the application of internal air pressure to form a tubular 'bubble.' The cooled tubular film may, after flattening, be sealed transversely at intervals of one bag length, and the separate bags severed from the length, or provided instead with lines of perforations or similar weakening by which they may subsequently be separated from a reeled length of bags.

Coating or impregnation of the flexible plastics sheet material is generally done by treating it with a solution or dispersion containing the insecticide. The rate at which insecticide is applied will generally be within the range 1.0 –100 mg. especially 4.0–20 mg.ft$^{-2}$ of total exterior surface, but greater or lesser amounts than this may be used, depending on the insecticide, the plastics material, and the use for which the bag is intended. It is preferred to treat the outside of the bag, or that surface of the flexible plastics sheet material which subsequently becomes the outside of the bag. This may be done, for example, by passing the flattened tubular film continuously through a bath of a solution or dispersion of the insecticide. It is preferably done by applying the insecticide to the bag surface in a lacquer or printing ink base. This lacquering or printing step is preferably carried out before the tubular film is transversely sealed and severed to form bags. It is desirably preceded by some treatment to make the plastics surface more retentive to lacquer or printing, e.g. corona discharge treatment.

It is not found generally necessary that the whole of the exterior of the bag be lacquered or printed, and it may not even be necessary to treat the whole of one side. Lacquer may be used to make the bag a pleasing or distinctive colour; printing ink may be used to print indicia including trademarks, indications of the intended function of the bag and preferably also an indication of the presence of the insecticide and precautions which should in consequence be observed.

It is a surprising feature of our invention that in favourable circumstances, the application of insecticide to the exterior of a bag may be effective to kill insects inside the bag.

Bags according to our invention find a variety of uses. For example they may be used to hold refuse, e.g. as dustbin liners. When so used they may have the effect of killing houseflies and like pests both in the dustbin and subsequently when the dustbin liner is removed to the refuse tip. They may also be used for horticultural purposes; for example a rose-bush heavily infested with aphids may be enveloped in a suitable bag according to our invention for 24 or 48 hours, resulting in rapid death of the aphids. Bags according to our invention may be used to enclose or package vegetables and fruit, e.g. dried beans; or bananas, both while still on the tree and while being transported to the consumer.

In order to prevent loss of insecticide from the bag, with possible loss of effectiveness in use, it is preferable to make them available for sale packed in impermeable containers, either singly or in bulk. The container may be of rigid metal or be an envelope or wrapping of foil, e.g. aluminum foil, or a paper/foil laminate.

Pirimiphos methyl is the BSI approved common name for the compound 2-diethylamino-6-methylpyrimidin-4-yl dimethyl phosphorothionate.

Pirimiphos ethyl is the BSI-approved common name for the compound 2-diethylamino-6-methylpyrimidin-4-yl diethyl phosphorothionate. The following Examples illustrate the invention.

EXAMPLE 1

Preformed rectangular transparent polyethylene bags, 100 gauge, 14 sq. ft. in surface area, made by a 'bubble' process from 'Alkathene' (Trade Mark) granules, of MFI 2 were used. These were opened out and attached to a metal frame. Their inside surfaces were then sprayed with solutions of pirimiphos methyl in industrial methylated spirits, using an aerograph spray gun giving a very fine mist spray. Dilution rates were chosen to give application rates of insecticide of from 5 to 100mg/sq foot (70 to 1,400 mg per bag). The bags were then left open for 5 minutes to allow the solvent to evaporate.

Bags so prepared were tested for insecticidal properties. 50 Adult Houseflies (*Musca domestica*) were introduced into each bag, the neck tied and the bag suspended from a beam. The time taken to kill 90 percent of the flies in each bag is shown in Table I below. This experiment was repeated at intervals over a period of 21 days, the bag being left exposed to the atmosphere throughout this time.

Table I

| Application rate of insecticide mg/sq foot | Time in minutes to give 90% kill | | | | |
|---|---|---|---|---|---|
| 100 | 6 | 6 | 10 | 25 | 35 |
| 50 | 6 | 7 | 25 | 60 | 90 |
| 10 | 13 | 30 | 120 | 120 | 225 |
| 5 | 13 | 75 | 60 | 90 | 300 |
| Days after impregnation of bags | 0 | 1 | 7 | 14 | 21 |

Further bags were prepared by an identical method and tested in a similar way, except that the flies were prevented from coming into contact with the sides of the bags by being suspended inside the bags in a muslin cage. The results are shown in Table II below.

TABLE II

| Application rate of insecticide mg/sq foot | Time in minutes to give 90% kill | | |
|---|---|---|---|
| 100 | 10 | 60 | 80 |
| 50 | 120 | 90 | 120 |
| 10 | | 180 | <390 | >300 |
| 5 | | 120 | <390 | >300 |
| Days after impregnation of bags | 7 | 14 | 21 |

EXAMPLE 2

Preformed bags of the type used in Example 1 were treated on their exterior surfaces with solutions of pirimiphos-methyl in isopropyl alcohol. Solutions containing the insecticides were dripped onto each bag from a pipette and then smeared over an area of about 1 square foot by rubbing part of the exterior surface against itself. Two application rates were used: 0.2 ml. and 0.8 ml. of an 18 percent solution, equivalent to 2.5 mg. and 10 mg./sq. foot of total exterior bag surface. Finally each bag was folded and closely wrapped in 100 gauge aluminum foil.

Bags thus prepared were unwrapped at intervals and tested in the same way as the bags of Example 1. Results are shown in Table III and IV below. In Test A the flies are confined only by the bags; in Test B they are in a muslin cage in the bag.

TABLE III

Bags unwrapped 3 days after treatment

| Test | Application rate, mg./sq.ft. | Time in hours to give 90% kill | | | | |
|---|---|---|---|---|---|---|
| A | 10 | 1¾–3¾ | ½–1 | 1–1¼ | ½–1 | 1½–1¾ |
| A | 2.5 | 1¼–3¾ | 1–2 | 1–1¼ | 1½–2 | 1¾–2¾ |
| B | 10 | 3¾–5½ | 1–2 | 1¼–1½ | 1–1¼ | 1¾–2¾ |
| B | 2.5 | 3¾–5½ | 1–2 | 1½–2 | 2–2½ | 2¾–3½ |
| Days after unwrapping of bags | | 0 | 1 | 2 | 8 | 15 |

TABLE IV

Bags unwrapped 31 days after treatment

| Test | Application rate mg/sq ft. | Time in hours to give 90% kill | |
|---|---|---|---|
| A | 10 | ½–1 | 1–1¾ |
| A | 2.5 | 1½–2 | 2¼–21 |
| B | 10 | 1½–2 | 2¼–21 |
| B | 2.5 | 1½–2 | 2¼–21 |
| Days after unwrapping of bags | | 0 | 9 |

EXAMPLE 3

Preformed polyethylene bags of 220 gauge film 14 square feet in exterior surface area were subjected to corona discharge treatment to make their surfaces more adhesive. The following printing ink formulation was prepared.

| | |
|---|---|
| pirimiphos-methyl technical (95% pure) | 10% w/v |
| solvent | 20% |
| printing ink W 13 (orange) | 70% |
| | 100% |

Using a hand-operated printing roller, this ink was applied as four strips each 3 inches × 30 inches down one face of the bag. The application rate was varied by applying one, two or three coats of ink; each coat being allowed to dry before a further coat was applied. Three bags were coated at each rate; a rough indication of the amount of insecticide applied was obtained by weighing the sacks before and after printing. Finally, each sack was individually wrapped in 100 gauge aluminum foil.

| Bag No. | Approximate weight gain/bag | Insecticide on exterior of bag (mg/sq foot) |
|---|---|---|
| 1–3 | 0.25 g. | 1.7 |
| 5–6 | 0.7 g. | 5.0 |
| 7–9 | 1.0 g. | 7.1 |

Bags were then tested by a modification of the methods used in Example 1. Sacks were placed in refuse bag holders, having a wire mesh body and an open neck covered with a loose-fitting plastic lid. Simulated refuse, consisting of balls of newspaper and a food pad, were placed in each bag, together with 25 flies. The mortality of the flies was assessed at intervals. Results are shown in Tables V and VI below.

TABLE V

Bags unwrapped 7 days after printing

| Bag No. | Insecticide (mg/sq foot) | Time in hours to give 90% kill | | |
|---|---|---|---|---|
| 1 | 1.7 | 4¾–6½ | 4–23 | 6½–22 |
| 4 | 5.0 | 2½–2¾ | 2½–3 | 6–6½ |
| 7 | 7.1 | 2½–2¾ | 2½–3 | 4½–6 |
| Days after unwrapping of bags | | 0 | 1 | 9 |

TABLE VI

Bags unwrapped 15 days after printing

| Bag No. | Insecticide (mg/sq foot) | Time in hours to give 90% kill | | |
|---|---|---|---|---|
| 2 | 1.7 | 6–21 | 3–19 | 6½–21 |
| 5 | 5.0 | 5–6 | 3–19 | 2½–6½ |
| 8 | 7.1 | 3–4½ | <2 | 2½–6½ |
| Days after unwrapping of bag | | 0 | 4 | 7 |

EXAMPLE 4

Tabular polyethylene film 100 gauge, prepared by a bubble process from 'Alkathene' of MFI 2 was corona discharge treated and then passed to a multi-stage printing press. The tube was printing on one side with a continuous repeating pattern of interlocking circles, using a printing ink formulation containing 10 percent pirimiphos-methyl 20 percent solvent (fast) and 70 percent red printing ink. On the other side of the tube was printed at intervals the I C I Roundel (Trademark) and the legend: "I C I for Home and Garden Insecticidal Dustbin Liner. Kills Flies! WARNING Wash hands after touching this sack. Do not allow to come into contact with food. Keep away from children." The printing ink formulation used for this legend consisted of 10 percent pirimiphos methyl, 20 percent solvent (slow) and 70 percent printing ink W13 (orange). After printing, the tube was passed to a heat sealing apparatus, which formed lateral sealed zones at intervals across it; the resulting product was then laterally severed midway between the sealed zones to form sacks. Each sack was individually wrapped in 100 gauge aluminum foil.

percent of the total outer surface of the film. After printing, the film was cut into bags (open at both sides) 24 inches wide by 48 inches long: one end of each bag was then sealed. Each bag had the same area of printing on it. The sacks so formed were then individually wrapped in 100 gauge aluminum film until required for use. Analysis one week later gave the results shown in Table VII below.

To test insecticidal activity the bags were placed either as liners inside a plastic dustbin or in a wire mesh sack holder. Several sheets of screwed-up newspaper a milky pad and lump sugar were placed inside each sack to simulate waste. 25 house flies (Musca domestica) were introduced into the sacks and the open ends closely covered with nylon gauze. Counts of the number of live flies visible were made at intervals over 24 hours. After emptying out the contents the sacks were left exposed to the atmosphere for 1 - 3 weeks before retesting in the same way. Results of the tests, which are given in Table VII below, show that all the treatments had a high insecticidal activity, with four exceptions giving a complete kill of houseflies within 3 hours. This activity showed a slight tendency to increase after exposure to the atmosphere for up to 3 weeks.

TABLE VII(A)

Clear plastic sacks

| Coats of ink | | Time of test | Pirimiphos methyl: mg./sack | Number of flies alive after— | | | | |
|---|---|---|---|---|---|---|---|---|
| Insecticidal | Non-insecticidal | | | 1 hr. | 2 hrs. | 3 hrs. | 4 hrs. | 24 hrs. |
| 1 | 0 | Day unwrapped | 370 | 15 | 10 | 0 | 0 | 0 |
|   |   | Exposed one week | 370 | 15 | 2 | 1 | 0 | 0 |
| 1 | 0 | Day unwrapped | 390 | 13 | 10 | 3 | 0 | 0 |
|   |   | Exposed one week | 390 | 15 | 0 | 0 | 0 | 0 |
| 2 | 0 | Day unwrapped | 1,080 | 20 | 0 | 0 | 0 | 0 |
|   |   | Exposed one week | 1,080 | 8 | 0 | 0 | 0 | 0 |
| 2 | 1 | Day unwrapped | 927 | 8 | 6 | 0 | 0 | 0 |
|   |   | Exposed one week | 927 | 15 | 0 | 0 | 0 | 0 |
| 0 | 0 | Day unwrapped | 0 |   |   |   |   | 20+ |
|   |   | Exposed 1 week | 0 |   |   |   |   | 20+ |

TABLE VII(B)

Pigmented Plastic Sacks

| Coats of ink | | Time of treatment | Mg. pirimiphos methyl per sack | Number of flies alive after— | | | | |
|---|---|---|---|---|---|---|---|---|
| Insecticidal | Non-insecticidal | | | 1 hr. | 2 hrs. | 3 hrs. | 4 hrs. | 5 hrs. |
| 1 | 0 | Immediately unwrapped | 400 | 20 | 12 | 1 | 0 | 0 |
|   |   | Exposed three weeks | 400 | 12 | 6 | 0 | 0 | 0 |
| 1 | 1 | Immediately unwrapped | 450 | 15 | 6 | 1 | 0 | 0 |
|   |   | Exposed three weeks | 450 | 12 | 2 | 0 | 0 | 0 |
| 2 | 0 | Immediately unwrapped | 1,100 | 10 | 3 | 1 | 0 | 0 |
|   |   | Exposed three weeks | 1,100 | 8 | 0 | 0 | 0 | 0 |
| 2 | 1 | Immediately unwrapped | 927 | 12 | 8 | 2 | 0 | 0 |
|   |   | Exposed three weeks | 927 | 4 | 2 | 1 | 0 | 0 |
| 0 | 0 | Immediately unwrapped | 0 |   |   |   |   | 20+ |
|   |   | Exposed three weeks | 0 |   |   |   |   | 20+ |

EXAMPLE 5

Bags were made on an in-line bag making machine, incorporating a three-stage printing press. Tubular 220 gauge polyethylene film, both clear and pigmented, prepared by a bubble process from 'Alkathene' of MFP 2 was corona discharge treated and passed to the printing press. It was there printed with one or two coats of ink containing pirimiphos methyl (as used in Example 3), in a pattern of rectangular blocks applied to the exterior of the tubular film. In some cases a top coat of ink not containing insecticide was overprinted. In all cases the printed area represented approximately 30

EXAMPLE 6

600 gussetted sacks were manufactured to a standard pattern. The sacks, length 34 inches, width (as layflat tubing) 28¼ inches were manufactured in black 220 gauge polythene. One coat containing 10 percent by weight pirimiphos methyl was printed as three strips each 4½ inches wide and 24 inches long on the face of a number of these sacks. The total printed area of 333 sq. inch (about 2⅓ sq. ft) covered approximately 17½% of the total sack area (13⅓ sq. ft). Sacks so printed carry approximately 100 mg. pirimiphos methyl per sack. Treated sacks were wrapped in aluminum foil.

Other sacks from the same batch were treated with several different insecticides as follows:

The insecticide was prepared as a 10 percent solution in solvent/printing ink (w 13) mixture. 2.0 g, 1.0 g or 0.5 g of solution were smeared over a portion of the outer surface of the sack, which was then left to dry for 10 minutes, and closely wrapped in aluminium foil.

All the sacks were then tested for insecticidal activity as in Example 5. Results are shown in Table VIII below.

TABLE VIII

| Insecticide | Vapour pressure, mm. Hg, 20° C. | Weight of solution, g. | Time of test | Number of flies alive after— | | | | | |
|---|---|---|---|---|---|---|---|---|---|
| | | | | ½ hr. | 1 hr. | 2 hrs. | 3 hrs. | 5 hrs. | 24 hrs |
| Dichlorvos | $1 \times 10^{-2}$ | 2.0 | Immediately after unwrapping | 0 | 0 | 0 | 0 | 0 | 0 |
| | | | 1 week after unwrpapping | 20+ | 20+ | 20+ | 20+ | 20+ | 20+ |
| Do | | 1.0 | Immediately after unwrapping | 0 | 0 | 0 | 0 | 0 | 0 |
| | | | 1 week after unwrapping | 20+ | 2+ | 20+ | 20+ | 20+ | ---- |
| Diazinon | $8.4 \times 10^{-5}$ | 2.0 | Immediately afrer unwrapping | 0 | 0 | 0 | 0 | 0 | 0 |
| | | | 1 week after unwrapping | 20 | 2 | 0 | 0 | 0 | 0 |
| Do | | 1.0 | Immediately after unwrapping | 20 | 2 | 0 | 0 | 0 | 0 |
| | | | 1 week after unwrapping | 20+ | 20+ | 5 | 3 | 2 | 0 |
| Fenitrothion | $5 \times 10^{-5}$ | 2.0 | Immediately after unwrapping | 20+ | 16 | 0 | 0 | 0 | 0 |
| | | | 1 week after unwrapping | 20+ | 20+ | 15 | 0 | 0 | 0 |
| Malathion | $1.3 \times 10^{-4}$ | 2.0 | Immediately after unwrapping | 20 | 6 | 0 | 0 | 0 | 0 |
| | | | 1 week after unwrapping | 20+ | 20+ | 20+ | 20+ | 20+ | 20+ |
| Lindane | | 2.0 | Immediately after unwrapping | 20+ | 20+ | 20+ | 20+ | 20+ | 20+ |
| | | | 1 week after unwrapping | 20+ | 20+ | 20+ | 20+ | 20+ | 20+ |
| Pirimiphos methyl | $1 \times 10^{-4}$ | 2.0 | Immediately afrer unwrapping | 12 | 1 | 0 | 0 | 0 | 0 |
| | | | 1 week after unwrapping | 20+ | 20 | 3 | 0 | 0 | 0 |
| Do | | 1.0 | Immediately after unwrapping | 20+ | 12 | 0 | 0 | 0 | 0 |
| | | | 1 week after unwrapping | 20+ | 20+ | 20+ | 10 | 3 | 0 |
| Sack printed with pirimiphos methyl (100 mg. per sack). | | | Immediately after unwrapping | 20+ | 8 | 0 | 0 | 0 | 0 |
| | | | 1 week after unwrapping | 20+ | 3 | 0 | 0 | 0 | 0 |
| Untreated sack | | | Immediately after unwrapping | 20+ | 20+ | 20+ | 20+ | 20+ | 20+ |
| | | | 1 week after unwrapping | 20+ | 20+ | 20+ | 20+ | 20+ | 20+ |

Dichlorves, diazinon, fenitrothion and malathion are the BSI - approved common names for 2,2-dichlorovinyl dimethyl phosphate; diethyl 2-isopropyl-6-methyl-4-pyrimidinyl phosphorothionate; dimethyl 3-methyl-4-nitrophenyl phosphorethionate; and S-(1,2-di(ethoxy-carbonyl)ethyl)dimethyl phosphorothiolothionate; respectively. Lindane is the ISO- approved common name for the gamma-isomer of 1,2,3,4,5,6-hexachlorocyclohexane.

We claim:

1. A bag formed from a flexible plastic sheet material selected from the group consisting of polyvinyl chloride, polypropylene, polysulphones, poly-4 methylpentene-1 and polyethylene and having an interior surface, an exterior surface and two ends together forming a container of said flexible plastic sheet material, a portion of said exterior surface having an adherent composition comprising pirimiphos methyl insecticide, having a vapor pressure at 20° C in the range $1 \times 10^{-3} - 1 \times 10^{-6}$ millimeters of mercury, in an amount within the range of 1 to 100 m.g. of said insecticide per square foot of said portion of said exterior surface.

2. A bag according to claim 1 which is open at both ends.

3. A bag according to claim 1 wherein said adherent composition comprises printing ink.

4. A bag according to claim 3 wherein said adherent composition is printed on to said exterior surface so as to form indicia thereon.

5. A bag according to claim 1 which is packed in a vapor impermeable metallic envelope.

* * * * *